(12) United States Patent
McCracken et al.

(10) Patent No.: US 6,339,812 B1
(45) Date of Patent: Jan. 15, 2002

(54) METHOD AND APPARATUS FOR HANDLING INVALIDATION REQUESTS TO PROCESSORS NOT PRESENT IN A COMPUTER SYSTEM

(75) Inventors: David E. McCracken, San Francisco; Martin M. Deneroff, Palo Alto, both of CA (US); Gregory M. Thorson, Altoona, WI (US); John S. Keen, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/410,139

(22) Filed: Sep. 30, 1999

(51) Int. Cl.[7] .......................... G06F 12/08; G06F 11/20

(52) U.S. Cl. ...................... 711/141; 711/144; 711/145; 711/148; 712/1; 712/28

(58) Field of Search ................................. 707/200, 201; 711/114, 121, 133, 136, 141, 144, 145, 148, 153, 160, 165, 173, 209, 220; 712/1, 28, 29, 30

(56) References Cited

U.S. PATENT DOCUMENTS

| | | | | |
|---|---|---|---|---|
| 5,394,555 A | * | 2/1995 | Hunter et al. ................ | 711/148 |
| 5,522,058 A | * | 5/1996 | Iwasa et al. ................. | 711/145 |
| 5,802,578 A | * | 9/1998 | Lovett ......................... | 711/147 |
| 5,940,860 A | * | 8/1999 | Hagersten et al. .......... | 711/147 |
| 6,092,155 A | * | 7/2000 | Olnowich .................... | 711/142 |

OTHER PUBLICATIONS

Censier, et al., "A New Solution to Coherence Problems in Multicache Systems," XP 000611768, *IEEE Transactions on Computers*, vol. C–27, No. 12, Dec., 1978, 7 pages.

Minnich, et al., "Reducing Host Load, Network Load, and Latency in a Distributed Shared Memory," XP 000166249, *IEEE Computer Society Press*, May–Jun., 1990, 9 pages.
Laudon, et al., "The SGI Origin: A ccNUMA Highly Scalable Server," XP–000738161, *Annual International Symposium on Computer Architecture*, Jun. 2, 1997, 11 pages.
International Search Report in International Application No. PCT/US 00/25832, dated Mar. 20, 2001, 7 pages.
Dai et al., Reducing Cache Invalidation Overheads in Wormhole Routed DSMs Using Multidestination, 1996.*
Message Passing, *Proceedings of the 1996 International Conference on Parallel Processing*, vol. 1, pp. 138–145, IEEE.*

(List continued on next page.)

Primary Examiner—William M. Treat
(74) Attorney, Agent, or Firm—Baker Botts L.L.P.

(57) ABSTRACT

A node controller (12) in a computer system (10) includes a processor interface unit (24), a memory directory interface unit (22), and a local block unit (28). In response to a memory location in a memory (17) associated with the memory directory interface unit (22) being altered, the processor interface unit (24) generates an invalidation request for transfer to the memory directory interface unit (22). The memory directory interface unit (22) provides the invalidation request and identities of processors (16) affected by the invalidation request to the local block unit (28). The local block unit (28) determines which ones of the identified processors (16) are present in the computer system (10) and generates an invalidation message for each present processor (16) for transfer thereto. Each of the present processors (16) process their invalidation message and generate an acknowledgment message for transfer to the processor interface unit (24) that generated the invalidation request. The local block unit (28) determines which ones of the identified processors (16) are not present in the computer system (10) and generates an acknowledgment message for each non-existent processor (16). Each acknowledgment message is transferred to the processor interface unit (24) which generated the invalidation request.

15 Claims, 3 Drawing Sheets

OTHER PUBLICATIONS

Hennessy et al., Cache–Coherent Distributed Shared Memory: Perspectives on its Development and Future, Mar. 1999.*

Challenges, *Proceedings of the IEEE*, vol. 87, No. 3, pp. 418–429.*

Williams et al., "Simulating the DASH Architecture in HASE," Proceedings of Simulation 1996, IEEE, pp. 137–146, 1996.*

Lenoski et al., "The Stanford DASH Multiprocessor," *Computer*, IEEE, vol. 25, iss. 3, pp. 92–103, Mar. 1992.*

* cited by examiner

US 6,339,812 B1

METHOD AND APPARATUS FOR HANDLING INVALIDATION REQUESTS TO PROCESSORS NOT PRESENT IN A COMPUTER SYSTEM

TECHNICAL FIELD OF THE INVENTION

The present invention relates in general to multi-processor computer system operation and more particularly to a method and apparatus for handling invalidation requests to processors not present in a computer system.

BACKGROUND OF THE INVENTION

A large computer system is conventionally implemented with a large number of processors accessed through node controllers at node locations. The node controllers include memory directories employing coarse directory protocols. Coarse directory protocols provide a technique that represent each processor in the computer system by saving space in the memory directory. Space is saved by grouping node controllers and associated processors that share information in memory. When it becomes necessary to invalidate all nodes with a shared copy of a cache line, invalidate commands are sent to all of the nodes within a group that includes the node that contains the shared copy of the memory. Typically, each node processes the invalidation command and sends an acknowledgment message back to the node that originated the invalidation command. Since full operation of the computer system does not continue until all expected acknowledgment messages are received, each node in a group must be present and operational for the computer system to work effectively. However, there may be situations where certain nodes of a group may not be present or may be in a failure state. Typical computer systems merely allowed the problem of sending invalidation messages to non-existent to occur or simply wasted directory space to handle the problem. Therefore, it is desirable to provide a technique to process invalidation commands for nodes that may not be currently present or operational in a computer system.

SUMMARY OF THE INVENTION

From the foregoing, it may be appreciated that a need has arisen for a technique to handle invalidation requests to processors that have been removed from or unavailable to computer system. In accordance with the present invention, a method and apparatus for handling invalidation requests to processors not present in a computer system are provided that substantially eliminate or reduce disadvantages and problems associated with conventional computer system operation.

According to an embodiment of the present invention, there is provided a method of handling invalidation requests to processors not present in a computer system that includes receiving an invalidation request and identities of processors affected by the invalidation request. A determination is made as to which processors are currently present in the computer system and which processors are currently not present in the computer system. Invalidation messages are generated and transferred to processors determined to be present in the computer system. Acknowledgment messages are returned from processors that received and processed their respective invalidation message. Acknowledgment messages are generated and returned for those processors determined to not be present in the computer system.

The present invention provides various technical advantages over conventional computer system operation. For example, one technical advantage is to avoid sending invalidation messages to non-existent processors in a computer system. Another technical advantage is to maintain effective operation of the computer system despite invalidation requests directed to non-existent processors. Yet another technical advantage is to filter out invalidation requests to non-existent processors and generate acknowledgment messages associated therewith. Still another technical advantage is to provide for the use of various coarse directory protocols in the computer system. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
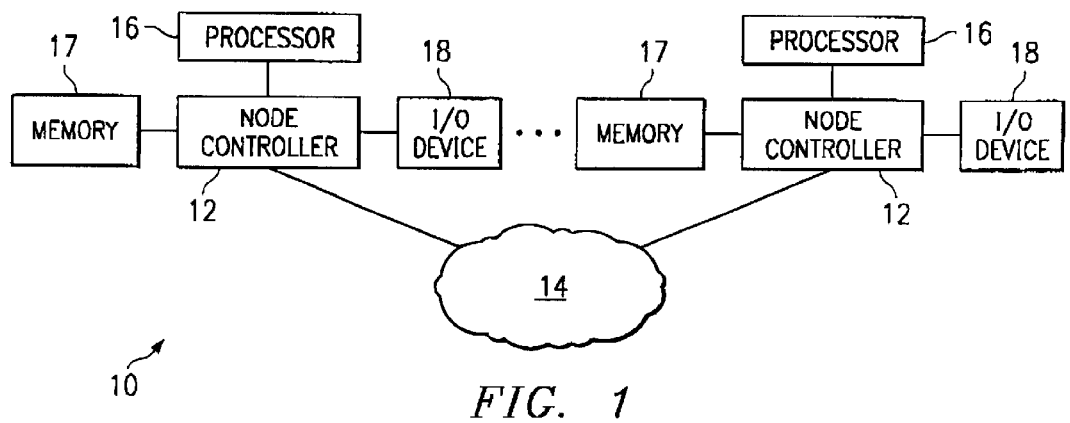
FIG. 1 illustrates a block diagram of a computer system.

FIG. 1 is a block diagram of a computer system 10. Computer system 10 includes a plurality of node controllers 12 interconnected by a network 14. Each node controller 12 processes data and traffic both internally and with other node controllers 12 within computer system 10 over network 14. Each node controller may communicate with a local processor 16, a local memory device 17, and a local input/output device 18.

Figure 2:
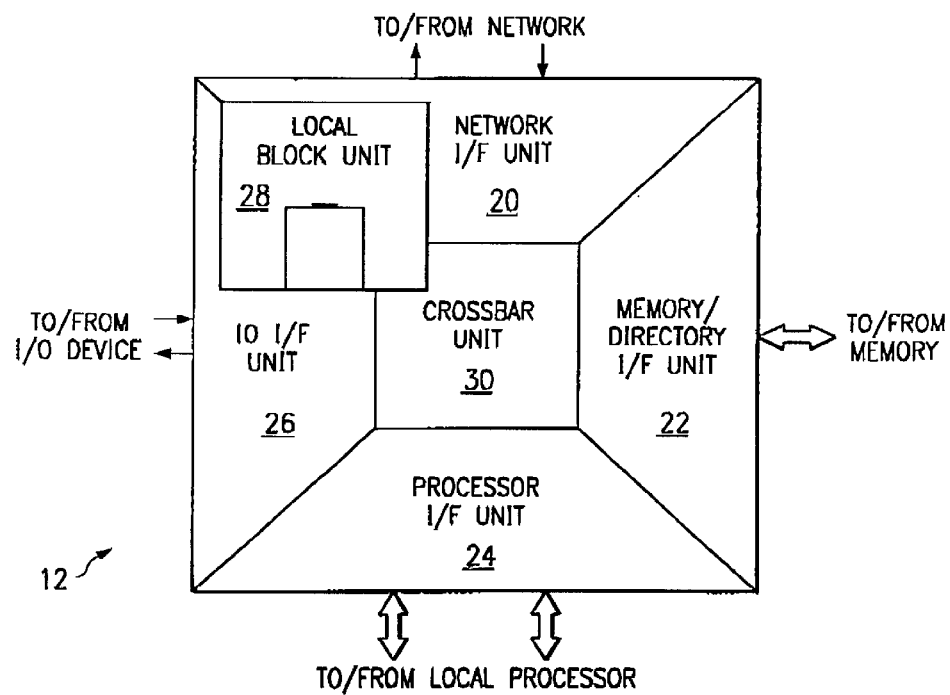
FIG. 2 illustrates a simplified block diagram of a node controller in the computer system.

FIG. 2 is a block diagram of node controller 12. Node controller 12 includes a network interface unit 20, a memory directory interface unit 22, a processor interface unit 24, an input/output interface unit 26, a local block unit 28, and a crossbar unit 30. Network interface unit 20 may provide a communication link to network 14 in order to transfer data, messages, and other traffic to other node controllers 12 in computer system 10. Processor interface unit 22 may provide a communication link with one or more local processors 16. Memory directory interface unit 22 may provide a communication link with one or more local memory devices 17. Input/output interface unit 26 may provide a communication link with one or more local input/output devices 18. Local block unit 28 is dedicated to processing invalidation requests and handling programmed input/output operations. Crossbar unit 30 arbitrates the transfer of data, messages, and other traffic for node controller 12.

Figure 3:
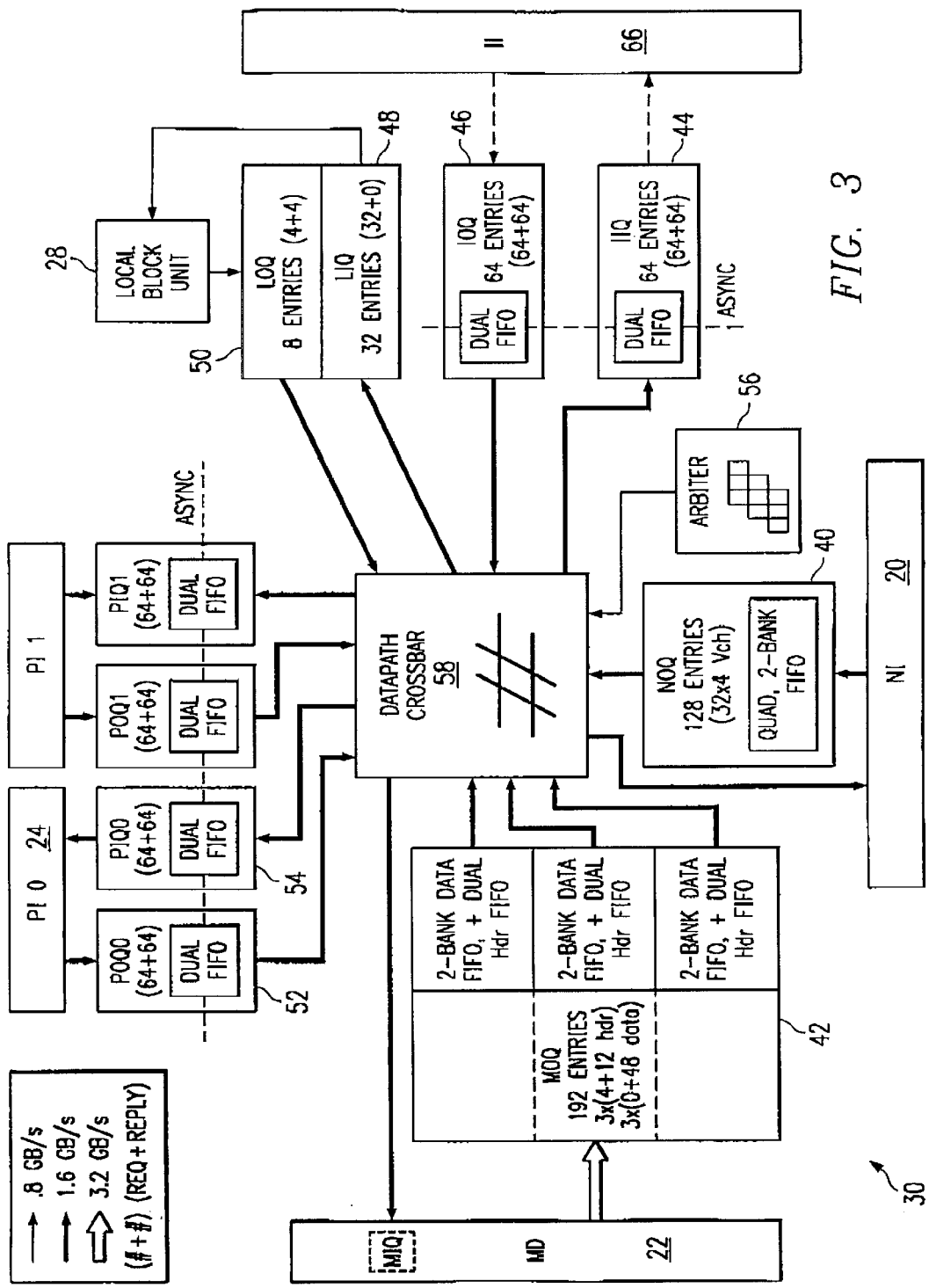
FIG. 3 illustrates a simplified block diagram of a crossbar unit in the node controller.

FIG. 3 is a block diagram of crossbar unit 30. Crossbar unit 30 includes a network interface output queue 40, a memory output queue 42, an input/output input queue 44, an input/output output queue 46, a local block input queue 48, a local block output queue 50, a processor interface output queue 52, a processor interface input queue 54, an arbiter 56, and a datapath crossbar 58. Datapath crossbar 58 provides data, messages, and other traffic to memory director interface unit 22 and network interface unit 20. Datapath crossbar 58 provides data, messages, and other traffic to processor interface input queue 54 and input/output input queue 44. Datapath crossbar 58 provides invalidation requests to local block input queue 48 for processing by local block unit 28. Datapath crossbar 58 receives invalidation messages from local block output queue 50 as generated by local block unit 28. Datapath crossbar 58 also receives data from memory output queue 42 and data, messages, and other traffic from input/output output queue 46. Datapath crossbar 58 also receives data, control messages, other traffic, and invalidation requests from processor interface output queue 52 and network interface output queue 40. Arbiter 56 determines the configuration of datapath crossbar 58 in transferring data, control messages, other traffic, and invalidation requests among all queues within crossbar unit 30 and units of node controller 12.

Figure 4:
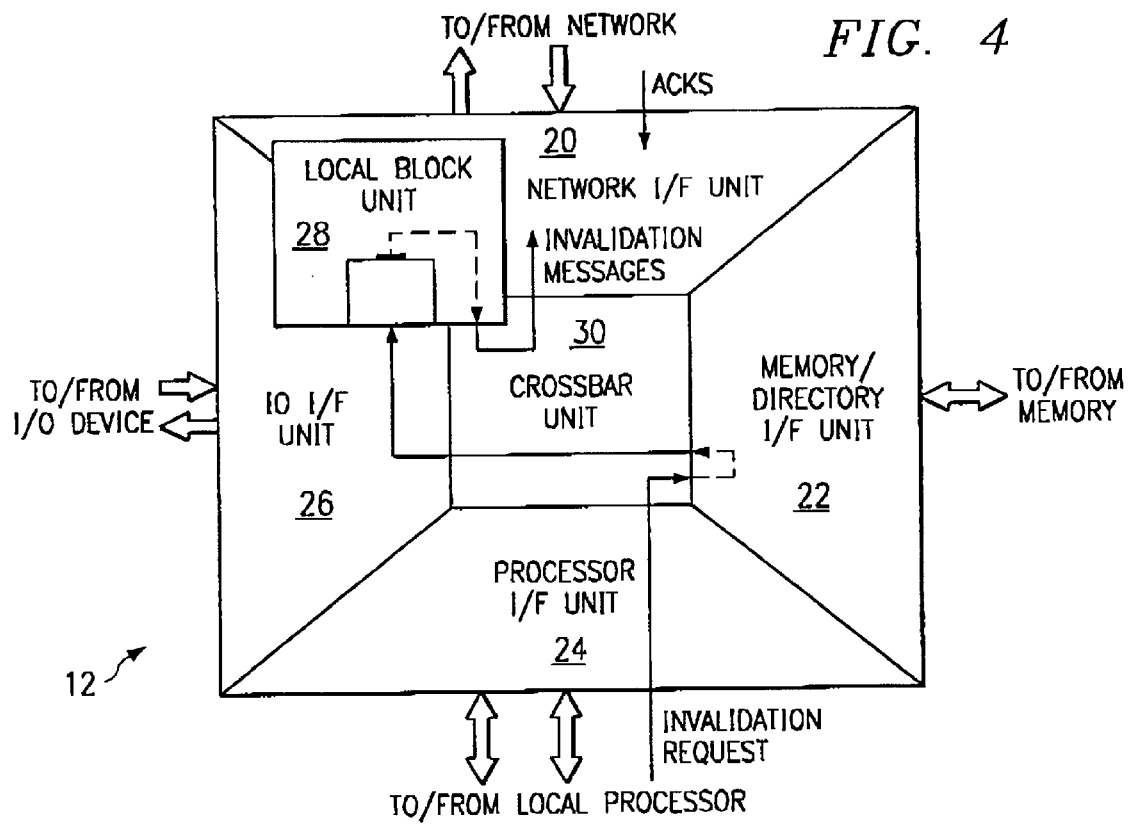
FIG. 4 illustrate the processing and broadcasting of invalidation messages in the node controller.

FIG. 4 shows how invalidation requests are processed by node controller 12. Local processor 16 accesses a memory location within local memory 18 through memory directory interface unit 22 and processor interface unit 24. If local processor 16 alters the particular data at the accessed memory location of local memory 18, local processor 16 generates an invalidation request provided to processor interface unit 26 for transfer to memory directory interface unit 22. Memory directory interface unit generates a compact form of the invalidation request that includes an identity list for all of the remote processors 16 of remote node controllers 12 in computer system 10 that share the particular data being altered. The invalidation request is provided to local block input queue 48 through processor interface output queue 52 as transferred by datapath crossbar 58 in crossbar unit 30. Local block unit 28 processes the invalidation request by generating an invalidation message for each remote processor 16 indicated within the invalidation request. The invalidation message notifies the remote processor 16 that its version of the particular data is no longer valid. Local block unit 28 provides the invalidation messages to local block output queue 50 for transfer to network interface unit 22 through datapath crossbar 58 as determined by arbiter 56. Arbiter 56 interleaves the invalidation messages with other traffic using any desired fairness algorithm to ensure that node controller 12 continues to provide a robust operation capability. Acknowledgment messages are generated by remote processors 16 upon receiving and processing its associated invalidation message. The acknowledgment messages are transferred to the local processor 16 that generated the invalidation request to indicate that the remote processor is aware that its version of the particular data is no longer valid.

In certain situations, various processors 16 may not be present within computer system 10 or may be in an otherwise inoperable state. To accommodate for this situation, local block unit 28 checks to determine if the identity list provided by memory directory interface unit includes processors which may not be currently in computer system 10. Local block unit 28 includes two registers to determine the presence of processors 16 in computer system 10—a region present register 60 and a nodes absent register 62. Region present register 60 identifies which processors 16 are present in computer system 10. Each bit in region present register 60 may represent a single processor 16 in computer system 10. Preferably, though, each bit in region present register 60 represents a group of processors 16 due to compression techniques in order to save register space for other uses. Nodes absent register 62 contains a list of processors 16 which are not in computer system 10. The use of nodes absent register 62 allows for individual processors 16 to be removed from computer system 10 for maintenance purposes while allowing other processors 16 within a group to continue operating and not be taken into an inoperable state as a result of the removal of an individual processor within the group.

Local block unit 28 will not send out an invalidation message for each processor 16 that is not present in the system. Local block unit 28 sends out an acknowledgment message to processor interface unit 24 for those processors 16 identified by memory directory interface unit 22 that are not present in computer system 10. In operation, local block unit 28 receives the invalidation request and identity of processors sharing the data that has been altered. For each processor 16 identified by memory directory interface unit 22, local block unit checks to see if a corresponding bit is set in region present register 60 indicating the presence of a processor group within computer system 10. If the corresponding bit is not set, it is now known that the particular processor 16 is not currently present within computer system 10. Local block unit 28 will generate an acknowledgment message for transfer to processor interface unit 24 so that operation of node controller 12 continues to effectively operate and does not wait for receipt of an acknowledgment message from a processor that is not there.

If the corresponding bit is set, local block unit 28 knows that the group of processors 16 that includes the particular processor 16 is present. Local block unit 28 then checks nodes absent register 62 to determine if the particular processor 16 is present in the processor group. If a corresponding bit in nodes absent register 62 is not set, local block unit 28 knows that the particular processor 16 is not present and generates the acknowledgment message as discussed above for transfer to processor interface unit 24. If the corresponding bit in nodes absent register 62 is set, local block unit 28 knows that the particular processor 16 is present. Local block unit 28 then sends out an invalidation message to the particular processor 16 for processing as discussed above. Upon processing its invalidation message, the particular processor 16 returns an acknowledgment message to the processor interface unit 24 within computer system 10 which originated the invalidation request.

Figure 5:
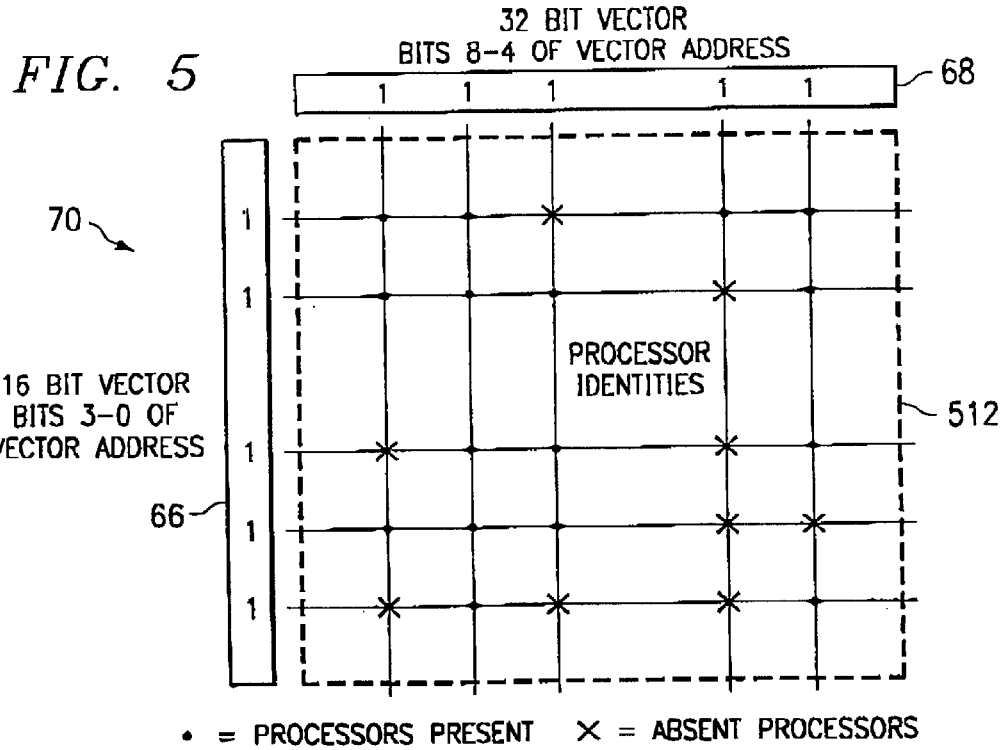
FIG. 5 illustrates how the identities of processors affected by the invalidation request are provided by the memory directory interface unit and determined by the local block unit.

FIG. 5 shows how the identities of processors 16 affected by the invalidation request are provided by memory directory interface unit 22 and determined by local block unit 28. Memory directory interface unit 22 provides a 9-bit vector address to local block unit 28. The vector address is used to determine the identities of processors affected by the invalidation request. The vector address has a first portion 66 and a second portion 68. First portion 66 provides a 16-bit vector according to bits 0, 1, 2, and 3 of the vector address. Second portion 68 provides a 32-bit vector according to bits 4, 5, 6, 7, 8 of the vector address. First portion 66 and second portion 68 represent rows and columns for a vector table 70. For each bit set in first portion 66 and second portion 68, processor identities are determined based on their intersection within vector table 70. Through this vector method, identities of processors 16 may be obtained that are not present in computer system 10. Thus, the technique discussed above handles those processors 16 that are identified in this fashion but are not present. Local block unit 28 performs its checking for the presence of each processor 16 identified by the crossing points in vector table 70 determined by the bits set in first portion 66 and second portion 68 of the vector address. Though shown as being a 9-bit field to identify 512 processors, the vector address may include any number of bits such that vector table 70 may be any size to accommodate any number of processors 16 within computer system 10.

In this manner, invalidation requests identifying nodes and processor in computer system 10 may be filtered out and appropriately handled while maintaining effective operation of computer system 10. A single node or processor of a group may be removed or placed into an inoperative state without forcing removal of or inactivating other nodes or processors within the group by essentially injecting a pseudo acknowledgment message into computer system 10 operation. The use of region present register 60 and absent nodes register 62 allow for various coarse directory protocols that employ different types of grouping scenarios to achieve efficient use of register space.

Thus, it is apparent that there has been provided, in accordance with the present invention, a method and apparatus for handling invalidation requests to processors not present in a computer system that satisfies the advantages set forth above. Although the present invention has been described in detail, it should be understood that various changes, substitutions, and alterations may be readily ascertainable by those of skill in the art and may be made herein without departing from the spirit and scope of the present invention as defined by the following claims.

What is claimed is:

1. A method of handling invalidation requests to processors not present in a computer system, comprising:

receiving an invalidation request;

receiving identities of processors affected by the invalidation request;

determining which ones of the identified processors are present in the computer system;

generating an invalidation message for each processor determined to be present in the computer system;

transferring the invalidation messages to the present processors.

2. The method of claim 1, further comprising:

determining which ones of the identified processors are not present in the computer system;

generating an acknowledgment message for each identified processor determined not to be present in the computer system.

3. The method of claim 2, further comprising:

transferring the acknowledgment messages to an originator of the invalidation request.

4. The method of claim 3, further comprising:

receiving acknowledgment messages returned from present processors in response to processing respective invalidation messages;

receiving acknowledgment messages associated with identified processors not present in the computer system.

5. The method of claim 1, wherein determining the presence of identified processors includes checking for set processor status bits in a register.

6. An apparatus for handling invalidation requests to processors not present in a computer system, comprising:

a memory directory interface unit operable to control access to and data manipulation for a memory;

a processor interface unit operable to generate an invalidation request in response to data manipulation in the memory, the processor interface unit operable to provide the invalidation request to the memory directory interface unit, the memory directory interface unit operable to generate an identification signal indicating which processors in the computer system are affected by the invalidation request;

a local block unit operable to determine which processors identified by the memory directory interface unit are present in the computer system, the local block unit operable to generate an invalidation message for each identified processor that is present, the local block unit operable to determine which processors identified by the memory directory interface unit are not present in the computer system, the local block unit operable to generate an acknowledgment message for each identified processor that is not present.

7. The apparatus of claim 6, wherein the local block unit transfers the invalidation messages to their respective present processors, the processor interface unit operable to receive acknowledgment messages from the present processors in response to processing of the associated invalidation message.

8. The apparatus of claim 6, wherein the local block unit transfers the acknowledgment messages to the processor interface unit.

9. The apparatus of claim 6, wherein the local block unit includes a region present register and a nodes absent register, the region present register providing an indication of which processor groups are present in the computer system, the nodes absent register providing an indication of which processors are absent from the processor groups.

10. The apparatus of claim 9, wherein the local block unit determines if a processor group for a particular processor represented in the region present register is present.

11. The apparatus of claim 10, wherein the local block unit determines if the particular processor represented in the nodes absent register is absent.

12. The apparatus of claim 11, wherein the local block unit generates an invalidation message associated with the particular processor in response to the determination that the processor group associated with the particular processor is present and the particular processor is not absent.

13. The apparatus of claim 11, wherein the local block unit generates an invalidation message associated with the particular processor in response to either the processor group of the particular processor not found to be present or the particular processor being identified as absent.

14. The apparatus of claim 6, wherein the local block unit receives a vector address from the memory directory interface unit, the local block unit operable to access a vector table in response to the vector address, the vector table identifying processors determined by the memory directory interface unit to be affected by the invalidation request.

15. The apparatus of claim 14, wherein the vector address is a 9-bit field operable to access 512 processor identities in the vector table.

* * * * *